(12) United States Patent
Spaulding et al.

(10) Patent No.: US 8,272,710 B2
(45) Date of Patent: Sep. 25, 2012

(54) BI-DIRECTIONAL PRINT MASKING

(75) Inventors: Kevin E. Spaulding, Spencerport, NY (US); Douglas W. Couwenhoven, Fairport, NY (US); Richard C. Reem, Hilton, NY (US); Christopher Rueby, North Chili, NY (US)

(73) Assignee: Eastman Kodak Company, Rochester, NY (US)

( * ) Notice: Subject to any disclaimer, the term of this patent is extended or adjusted under 35 U.S.C. 154(b) by 766 days.

(21) Appl. No.: 12/174,061

(22) Filed: Jul. 16, 2008

(65) Prior Publication Data

US 2010/0013878 A1    Jan. 21, 2010

(51) Int. Cl.
*B41J 2/205* (2006.01)
(52) U.S. Cl. .......................................................... 347/15
(58) Field of Classification Search ............... 347/14, 347/15
See application file for complete search history.

(56) References Cited

U.S. PATENT DOCUMENTS

| | | | |
|---|---|---|---|
| 4,746,935 A | 5/1988 | Allen | |
| 4,967,203 A | 10/1990 | Doan et al. | |
| 5,416,612 A | 5/1995 | Ingraham et al. | |
| 5,790,150 A | 8/1998 | Lidke et al. | |
| 5,923,349 A | 7/1999 | Meyer | |
| 5,992,962 A | 11/1999 | Yen et al. | |
| 6,086,181 A * | 7/2000 | Majette et al. | 347/16 |
| 6,206,502 B1 * | 3/2001 | Kato et al. | 347/41 |
| 6,238,037 B1 | 5/2001 | Overall et al. | |
| 6,254,217 B1 * | 7/2001 | Askeland et al. | 347/43 |
| 6,310,640 B1 | 10/2001 | Askeland | |
| 6,354,692 B1 | 3/2002 | Ross | |
| 6,375,307 B1 | 4/2002 | Vinals et al. | |
| 6,454,389 B1 | 9/2002 | Couwenhoven et al. | |
| 6,545,773 B1 | 4/2003 | Hudson | |
| 7,054,034 B2 | 5/2006 | Underwood et al. | |
| 7,301,668 B2 * | 11/2007 | Kawanabe et al. | 358/1.8 |
| 7,715,043 B2 * | 5/2010 | Billow et al. | 358/1.8 |
| 8,157,343 B2 * | 4/2012 | Marumoto | 347/14 |
| 2003/0048327 A1 | 3/2003 | Serra et al. | |
| 2006/0087527 A1 * | 4/2006 | de Pena et al. | 347/12 |
| 2007/0201054 A1 | 8/2007 | Billow et al. | |
| 2008/0204494 A1 * | 8/2008 | Jahana et al. | 347/12 |

* cited by examiner

*Primary Examiner* — Charlie Peng
(74) *Attorney, Agent, or Firm* — Kevin E. Spaulding

(57) ABSTRACT

A method for reducing banding artifacts for bi-directional multi-pass printing on an inkjet printer utilizing a printhead with a plurality of ink nozzles includes defining different print masks to be used for leftward and rightward printing passes such that both the order of ink laydown and the timing between ink laydown on different passes are each substantially constant for a given horizontal position within the image, independent of the vertical position within the image; and printing an input image on the inkjet printer with the defined print masks using a bi-directional multi-pass print mode.

9 Claims, 11 Drawing Sheets

BI-DIRECTIONAL PRINT MASKING

FIELD OF THE INVENTION

This invention pertains to the field of inkjet printing systems, and more particularly to a method for reducing banding artifacts associated with bi-directional multi-pass printing on an inkjet printer.

BACKGROUND OF THE INVENTION

A typical inkjet printer reproduces an image by ejecting small drops of ink from a printhead containing ink nozzles, where the ink drops land on a receiver medium (typically paper) to form ink dots. Inkjet printers typically reproduce color images by using a set of color inks, usually cyan, magenta, yellow, and black. It is well known in the field of inkjet printing that if ink drops placed at neighboring locations on the page are printed at the same time, then the ink drops tend to flow together on the surface of the page before they soak into the page. This can give the reproduced image an undesirable grainy or noisy appearance often referred to as "coalescence". It is known that the amount of coalescence present in the printed image is related to the amount of time that elapses between printing adjacent dots. As the time delay between printing adjacent dots increases, the amount of coalescence decreases, thereby improving the image quality. There are many techniques present in the prior art that describe methods of increasing the time delay between printing adjacent dots using techniques referred to as "interlacing", "print masking", or "multi-pass printing". These methods often involve advancing the paper by an increment less than the printhead width for each printing pass. As a result, successive passes or "swaths" of the printhead overlap, which has the additional advantage that it can help to reduce one-dimensional periodic artifacts referred to as "bands" or "banding" that can result due to clogged or misdirected ink nozzles. See, for example, U.S. Pat. Nos. 4,967,203 and 5,992,962. The term "print masking" generically means printing subsets of the image pixels in multiple partially overlapping passes of the printhead relative to a receiver medium.

Another attribute of modern inkjet printers is that they typically possess the ability to vary (over some range) the amount of each ink that is deposited at a given location on the page. Inkjet printers with this capability are referred to as "multitone" inkjet printers because they can produce multiple density tones at each location on the page. Some multitone inkjet printers achieve this by varying the volume of the ink drop produced by the nozzle by changing the electrical signals sent to the nozzle or by varying the diameter of the nozzle. See for example U.S. Pat. No. 4,746,935. Other multitone inkjet printers produce a variable number of smaller, fixed size droplets that are ejected by the nozzle, all of which are intended to merge together and land at the same location on the page. See for example U.S. Pat. No. 5,416,612. These techniques permits the printer to vary the size or optical density of a given ink dot, which produces a range of density levels at each location, thereby improving the image quality.

Another common way for a multitone inkjet printer to achieve multiple density levels is to print a small amount of ink at a given location on several different passes of the printhead over that location. This results in the ability to produce a greater number of density levels than the nozzle can fundamentally eject, due to the build up of ink at the given location over several passes. See, for example, U.S. Pat. No. 5,923,349.

In U.S. Pat. No. 5,790,150, Lidke et al. disclose a method where multiple passes are made over the page while fractionally advancing the page. In each pass, the pattern of dots in the data swath is constructed with sufficient spacing between the dots such that the printhead can be scanned across the page at a velocity that is higher than the firing frequency limit of the nozzles.

In U.S. Pat. No. 6,310,640, Askeland discloses a print masking method in which nozzles at the ends of the printhead print with lower duty than nozzles near the center of the printhead, thereby reducing the possibility of banding artifacts occurring at the boundaries between successive printed swaths.

In U.S. Pat. No. 6,206,502 Kato et al. also discloses a method for reducing the duty for nozzles at the ends of the printhead. This method involves using a page advance which is smaller than the number of nozzles in the printhead divided by the number of passes, so that there is a region at the ends of the printhead where the passes overlap for an additional pass. The goal of this is to hide artifacts that can result at the boundaries of the printhead due to page advance errors, etc. Vinals et al disclose a similar method in U.S. Pat. No. 6,375,307 for a single-pass printing configuration. These print masking methods are sometimes referred to as "fractional print masking" in the literature.

In U.S. Pat. No. 6,238,037, Overall et al. disclose a print masking method for a multilevel inkjet printer in which the print mask contains a set of threshold values. A dot will print at a given location on a given pass if the multitone code value for that pixel is greater than the threshold for that pass. This method requires that if a dot gets printed at a given pixel on pass N, then it also must receive dots on passes 0 through N−1.

In U.S. Pat. No. 6,454,389, Couwenhoven et al. disclose a print masking method suitable for multilevel inkjet printers that can produce multiple sized ink drops.

In U.S. Patent Application Publication No. 2007/0201054, which is incorporated herein by reference, Billow et al. disclose a print masking that utilizes a print mask having a plurality of mask planes, each mask plane corresponding to a multitone code value. This approach has the advantage that dot patterns printed in response to different multitone levels can be independent from each other.

The method of Billow et al will now be described in more detail to illustrate print masking. Turning to FIG. 1, a typical inkjet printer system is shown in which an image preprocessor 20 receives a digital image from a host computer 10, and performs standard image processing functions such as sharpening, resizing, color conversion, and multitoning to produce a multitoned image signal i. The multitoned image signal i is composed of a set of color data planes hereinafter referred to as color channels. Each color channel corresponds to a particular colorant in the printer, such as the cyan, magenta, yellow, or black inks used in a typical inkjet printer. The data including each color channel is a two dimensional array (width=w, height=h) of individual picture elements, or "pixels". The pixel's location in the image is specified by its (x,y) coordinates in the array, where $0 \leq x \leq w-1$ and $0 \leq y \leq h-1$. The x location of the pixel is also referred to as the pixel column number, and the y location of the pixel is referred to as the pixel row number. The term "signal" is used to generically refer to the array of pixels having digital code values that form the image.

A swath data generator 30 then receives the multitoned image signal i and generates a swath data signal s, which controls the volume of ink printed by an inkjet printhead (or printheads) 40. The process of print masking is contained within the swath data generator 30. Prior to multitoning, each pixel contains a numeric code value (typically on the range {0,255}) for each color channel that indicates the amount of the corresponding colorant to be placed at the given pixel's location in the image. After multitoning (at the output of the image preprocessor 20), the image is represented by multi-tone code values, where the range of pixel code values has been reduced to match the number of density levels that the inkjet printer can produce. For binary inkjet printers, the possible multitone code values will be either 0 or 1, indicating whether to print 0 or 1 drops of ink. Multitone inkjet printers will accept multitone code values on the range {0,N−1}, where N is the number of possible multitone code values, and is normally the number of density levels (or number of drops) that the multitone inkjet printer can produce at a given pixel.

Turning now to FIG. 2, the details of the swath data generator 30 are shown. A "swath" of data is defined as the dot ejection data that is required during one motion of the printhead across the page. In FIG. 2, according to the method of Billow et al., a print mask for a given color contains a set of mask planes 50, 52, 54, 56, each of which has a $M_w \times M_h$ array of individual mask elements 60.

Often, the mask height $M_h$ will be equal to the number of nozzles in the printhead, although this is not a fundamental restriction, and a mask height of lesser or greater value can be used. One of the mask planes is selected for a given pixel according to the multitone code value of the multitoned image signal i, as shown in FIG. 2. A pixel column index $x_m$ and a pixel row index $y_m$ are computed according to the following equations:

$$x_m = x \% M_w \quad (1)$$

$$y_m = y \% M_h \quad (2)$$

where x is the pixel column number and y is the pixel row number of the current pixel being processed, $M_w$ is the mask width, $M_h$ is the mask height, and the "%" symbol indicates the mathematical modulo operator. The value of the swath data signal s is then determined by selecting a mask element 62 from the chosen mask plane according to:

$$s = \text{MaskPlane}(i, x_m, y_m) \quad (3)$$

Turning now to FIG. 3, an example mask plane 70 is shown. In the mask plane 70, each of the individual mask elements 80 can be one of two values: a first value (0) indicating that no ink drop is to be ejected, and a second value (1) indicating one drop of ink is to be ejected. Thus, if the mask plane 70 corresponds to multitone code value 1, and a uniform 8×8 input image of multitone code value 1 was input to the swath data generator 20, then a dot pattern indicated by the mask elements having value "1" in the mask plane 70 would be printed in one pass of the printhead. For purposes of illustration, the mask plane 70 is shown as having a mask width and mask height of 8, although one skilled in the art will recognize that a mask of any arbitrary size can be used. Generally, mask sizes will be significantly larger than this, with the mask height typically being equal to the height of the printhead.

Turning now to FIG. 4, the dot patterns resulting from three subsequent passes of an inkjet printhead having 8 nozzles in response to a uniform 8×8 input image of multitone code value 1 are shown. In this example, the print mask used has the mask plane 70 of FIG. 3 set to correspond to multitone code value 1, and the receiver media is advanced by four raster lines between each pass of the printhead. Since the input image has a uniform field of multitone code value 1, mask plane 70 will be selected for every pixel in the 8×8 image, and the pattern of dots printed in each of the three successive swaths will correspond to the pattern of 1s in the mask plane 70. The resulting swath patterns 90, 92, 94 are shown offset horizontally from each other, and the resulting pattern of ink dots 96 is shown, produced by overlapping the individual swath patterns. Note that in regions where two successive print passes overlap, every pixel location has received one drop of ink, which corresponds to the desired output for the 8×8 input image of multitone code value 1. Thus, the print mask shown in the example is appropriate for use in a "2-pass" printmode, meaning that two passes of the printhead are required for the desired final dot patterns to be printed. This also means that the mask plane 70 is designed such that the top half and bottom half of the mask, when overprinted on two subsequent print swaths, will produce the desired number of ink drops at each pixel. In this case, this implies that the top half and the bottom half of the mask plane 70 are complementary, such that a single ink drop will be printed at each location.

Often inkjet printers are configured to print in a bi-directional print mode, where ink is applied as the printhead moves in both rightward and leftward directions. A common problem with inkjet printers that utilize bi-directional multi-pass printing is that they can be susceptible to banding artifacts caused by differences in the order of ink laydown and the timing between ink laydown on different passes. These differences can cause systematic variations in the produced color due to interactions between the ink and media. For example, consider FIG. 5, which illustrates a bi-directional 2-pass print mode. A printhead having an associated print mask 100 first moves from left-to-right, printing ink in a first swath 101 (indicated by a pattern of upward sloping diagonal lines). The paper is then advanced by half of the printhead height and the printhead makes a second pass over the paper, this time moving from right-to-left in a second swath 102 (indicated by a pattern of downward sloping diagonal lines). The paper is then advanced again, and the printhead prints a third swath 103 (indicated by a pattern of vertical lines), moving from left-to-right. The print mask 100 is labeled with two sections, 1 and 2. Section 1 corresponds to the part of the printhead that prints on the media the first time it passes over a given region of the page. Likewise, section 2 corresponds to the part of the printhead that prints on the media the second time it passes over a given region of the page.

It can be seen that there are differences in timing between ink laydown on different print passes, both across the page, as well as down the page. For example, consider a first overlap region 104 where ink is first applied during the rightward first swath 101, and then during the leftward second swath 102. In a left portion of the first overlap region 105 there will be a relatively long time delay between the times that ink is applied on the first swath 101 and the second swath 102. This is due to the fact that the printhead must travel all the way across the page, then turn around and come all the way back across the page. However, in a right portion of the first overlap region 106 there will be a relatively short time delay between the times that ink is applied on the first swath 101 and the second swath 102. This is because the printhead needs to travel a shorter distance before it turns around and comes back. The reverse is found to be true in a second overlap region 107 where ink is first applied during the leftward second swath 102, and then during the rightward third swath 103. In a left portion of the second overlap region 108 there will be a relatively short time delay between the swaths, whereas in a right portion of the second overlap region 109 there will be a relatively long time delay between the passes.

The differences in the time delays, both across the page and from swath-to-swath, can result in significant differences in the characteristics of the reproduced image. When there is a longer time delay between passes, the ink applied during the first pass will have a longer time to dry or soak in to the paper. This can result in noticeable differences in the density of the printed region. Additionally, there can also be noticeable differences in the image structure characteristics. For example, coalescence artifacts, as well as surface characteristics such as gloss and haze, are often observed to be a function of the timing between when neighboring ink drops are applied. Typically, the swath-to-swath differences at a given horizontal position in the image are much more objectionable than the variations across the page. This is because the swath-to-swath differences produce a periodic artifact where the image characteristics vary for alternating swaths. These artifacts are sometimes referred to as bi-directional banding artifacts since they are inherently related to bi-directional multi-pass print modes. The magnitude of these artifacts is quite dependent on the characteristics of the particular ink and media used in the inkjet printer, as well as print mode attributes such the amount of ink, the number of passes and the printing speed. The magnitude of the bi-directional banding artifacts can even be affected by the size of the image since this can have an effect on how long it takes the printhead to travel across the page. For many combinations of ink, media and print mode, the bi-directional banding artifacts have been found to be quite objectionable.

Bi-directional banding artifacts can be even more severe for the case of printing color images with multiple color inks. Consider the case of a color inkjet printer using cyan, magenta, yellow and black inks. Typically, each ink will be printed using a different column of nozzles in the printhead. Therefore, as the printhead moves back and forth across the paper, there will also be differences in the order that the different color inks are applied. For example, consider the case where a uniform blue image region is to be printed using equal amounts of cyan and magenta inks. If the cyan nozzles are located to the right of the magenta nozzles in the printhead, they will be applied before the magenta drops on a rightward swath, but after the magenta drops on a leftward pass.

Consider the case where a blue image region is printed using the 2-pass configuration shown in FIG. 5. In the left portion of the first overlap region 105 the ink will be applied as cyan/magenta/long delay/magenta/cyan. However, in the right portion of the first overlap region 106 the ink will be applied as cyan/magenta/short delay/magenta/cyan. Similarly, in the left portion of the second overlap region 108 the ink will be applied as magenta/cyan/short delay/cyan/magenta, and in the right portion of the second overlap region 109 the ink will be applied as magenta/cyan/long delay/cyan/magenta. Therefore, at a horizontal position on the left edge of the page, the image will alternate back and forth between regions that vary in both the order of ink laydown and the timing between ink laydown on different passes. This can cause objectionable periodic bi-directional banding artifacts that vary in both color (lightness, hue and/or chroma) and image structure. Generally the magnitude of the bi-directional banding will decrease towards the center of the page where the contributions to the bi-directional banding that result from differences in the timing between ink laydowns will be negligible, leaving only the contributions that result from differences in the order of ink laydown. The magnitude of the bidirectional banding will then increase again for horizontal positions toward the right side of the page, although the phase of the banding artifacts that result from differences in the timing between ink laydowns will be reversed relative to the left side of the page. The magnitude of the bi-directional banding artifacts is often much more objectionable for image regions printed with two or more colored inks than it is for image regions using only a single ink since the reproduced color can be strongly influenced by which ink drops are printed on top.

A variety of methods have been proposed to alleviate the objectionable bidirectional banding artifacts. One solution is to use only uni-directional print modes where ink is only printed when the printhead is moving in one direction (e.g., rightward). However, this solution significantly limits the throughput of the printer since it is necessary to wait for the printhead to return back to the starting position before printing another swath.

Another step that can be taken is to slow down the printing speed to give the ink/media interactions more time to stabilize between passes, but this too will significantly impact the printer throughput. Note that while this approach can help reduce the contributions of the bi-directional banding that are due to differences in the timing between ink laydowns, it will not alleviate the contributions that result from differences in ink ordering.

Another way to reduce the magnitude of the bidirectional banding artifacts is to increase the number of printing passes. This will effectively slow down the rate of ink deposition and dilute the impact of the differences in ink order and timing at any given location. However, this will also have a direct impact on the throughput of the printer, so it is not a desirable solution for applications where print speed is a critical requirement.

Another solution that has been proposed is to modify the amount of ink laydown for the rightward and leftward printing passes. One way to accomplish this is to use different color transforms to process the image for the different printing passes. For example, see U.S. Pat. Nos. 6,354,692 and 7,054,034, and U.S. Patent Application Publication No. 2003/0048327. Alternatively, an ink depletion operation can be used to modify the amount of ink that is printed depending on the print direction. One way that this can be accomplished is to modify the print masks as described in U.S. Pat. No. 6,545,773. These methods can help alleviate the component of the bi-directional banding that results from differences in ink ordering. However, they will be ineffective at compensating for the contributions of the bidirectional banding that result from differences in the timing between ink laydowns since these effects will vary from left to right across the page, and these methods do not provide for changing the ink laydown as a function of the horizontal position.

SUMMARY OF THE INVENTION

The present invention represents a method for reducing banding artifacts for bidirectional multi-pass printing on an inkjet printer utilizing a printhead with a plurality of ink nozzles comprising defining different print masks to be used for leftward and rightward printing passes such that both the order of ink laydown and the timing between ink laydown on different passes are each substantially constant for a given horizontal position within the image, independent of the vertical position within the image; and printing an input image on the inkjet printer with the defined print masks using a bi-directional multi-pass print mode.

It is an advantage of the present invention that images with reduced bidirectional banding artifacts can be produced for inkjet printers using bi-directional multi-pass print modes.

It has the additional advantage that it will reduce bi-directional banding artifacts that result from both differences in the order of ink laydown, as well as the timing between ink laydown on different passes.

It is yet another advantage of the present invention that the reduction in bidirectional banding artifacts can be achieved without a significant impact on the printing speed. In some embodiments of the present invention, the impact on the printing speed will be negligible.

DETAILED DESCRIPTION OF THE INVENTION

The present invention represents a method to reduce bi-directional banding artifacts typically associated with bi-directional multi-pass printing on an inkjet printer by way of a novel method for defining different print masks for leftward and rightward printing passes. The leftward and rightward print masks are defined such that the order of ink laydown and the timing between ink laydown on different passes are substantially constant for a given horizontal position within the image, independent of the vertical position within the image.

Figure 6:
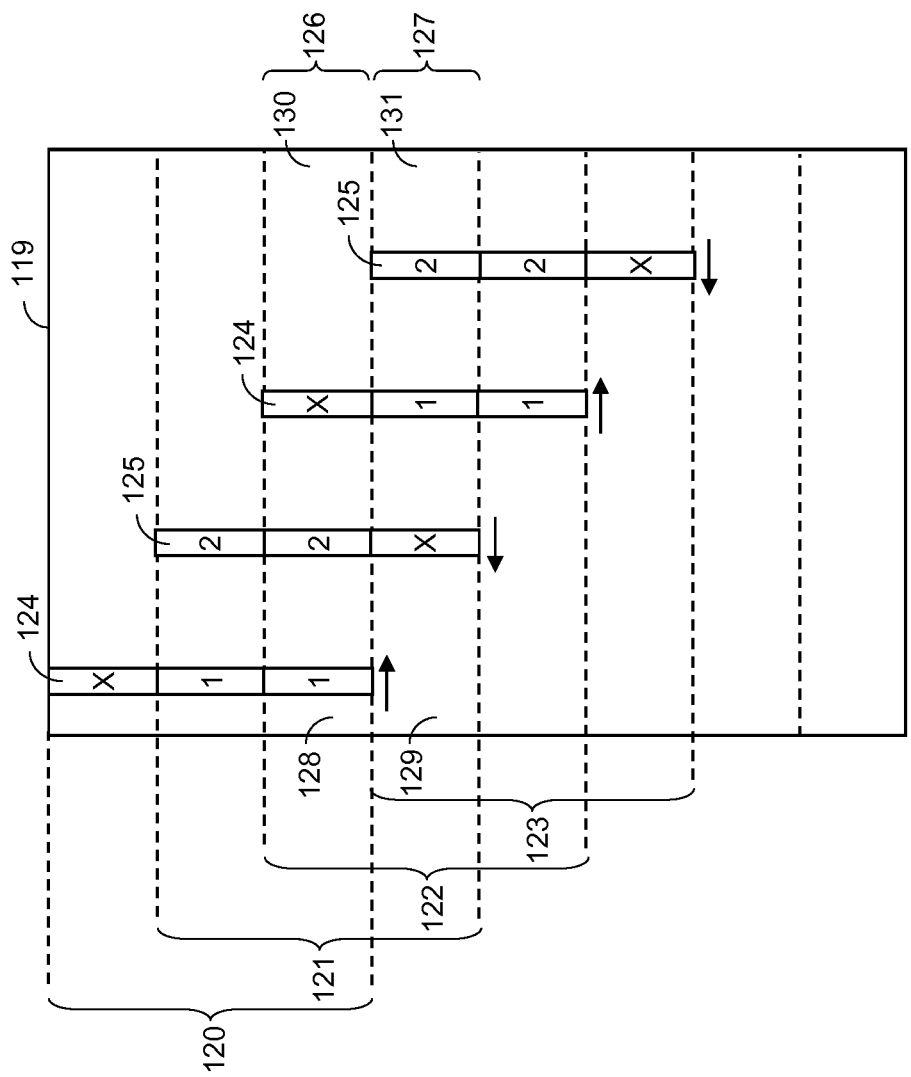
FIG. 6 is a diagram illustrating a 2-pass print masking configuration in accordance with the present invention.

Turning now to FIG. 6, the method of the present invention will be described. A page 119 is printed on an inkjet printer using a bi-directional multi-pass print mode by moving a printhead horizontally across the page in a first direction (e.g. rightward), firing ink drops from nozzles on the printhead as it passes over a receiver media such as paper. The paper is then advanced by some distance less than the height of the printhead, and the printhead is then moved back across the head in the other direction firing additional ink drops. This process is repeated until the entire image is printed. This particular example illustrates a 2-pass print mode, where, for any given region of the page, ink is printed during two different printing passes. However, as will be described later, this method can be generalized to print modes with any number of printing passes.

The movement of the printhead across the page is typically referred to as a printing pass, or sometimes as a print swath. FIG. 6 illustrates a sequence of four printing passes: a first printing pass 120 where the printhead is moved across the page in a rightward direction; a second printing pass 121 where the printhead is moved across the page in a leftward direction; a third printing pass 122 where the printhead is again moved across the page in a rightward direction; and a forth printing pass 123 where the printhead is again moved across the page in a leftward direction.

An important feature of the present invention is that different print masks are used for the rightward and leftward printing passes. A rightward print mask 124 is used for the rightward printing passes (i.e., the first printing pass 120 and the third printing pass 122). A leftward print mask 125 is used for the leftward printing passes (i.e., the second printing pass 121 and the fourth printing pass 123). The rightward print mask 124 and the leftward print mask 125 are designed in a manner such that the order of ink laydown and the timing between ink laydown on different passes are substantially constant for a given horizontal position within the image independent of the vertical position within the image.

In one preferred embodiment of the present invention, the rightward print mask 124 and the leftward print mask 125 are defined by starting from a conventional multi-pass print mask and rearranging segments of the print mask to form two new print masks. The example shown in FIG. 6 illustrates how the print masks can be formed from conventional 2-pass print masks, such as the mask plane shown in FIG. 3. The rightward print mask 124 includes 3 segments corresponding to different subsets of the printing nozzles, one segment labeled as "X" and the other two segments labeled as "1". The segment labeled as "X" corresponds to a set of unused ink nozzles on one end of the printhead (in this case the top end). The segments labeled with a "1" are formed by extracting a segment of a conventional 2-pass print mask and inserting it into the rightward print mask 124 in two different positions. The segment of the conventional 2-pass print mask that is extracted corresponds to the part of the printhead that prints on the media the first time it passes over a given region of the page. For the print mask shown in FIG. 3, this would correspond to the lower half of the print mask (pixel row indices 4-7). The leftward print mask 125 also includes 3 segments corresponding to different subsets of the printing nozzles, one segment labeled as "X" and the other two segments labeled as "2". The segment labeled as "X" again corresponds to a set of unused ink nozzles, this time on the other end of the printhead. The segments labeled with a "2" are formed by extraction a segment of a conventional 2-pass print mask and inserting it into the leftward print mask 125 in two different positions. The segment of the conventional 2-pass print mask that is extracted corresponds to the part of the printhead that prints on the media the second time it passes over a given region of the page. For the print mask shown in FIG. 3, this would correspond to the upper half of the print mask (pixel row indices 0-3).

To understand how the method of the present invention satisfies the required condition that the order of ink laydown and the timing between ink laydown on different passes are substantially constant for a given horizontal position within the image, independent of the vertical position within the image, consider a first overlap region 126 and a second overlap region 127. The first overlap region 126 corresponds to the region of the page where the first printing pass 120, the second printing pass 121 and the third printing pass 122 all overlap. The second overlap region 127 corresponds to the region of the page where the second printing pass 121, the third printing pass 122 and the fourth printing pass 123 all overlap.

Figure 5:
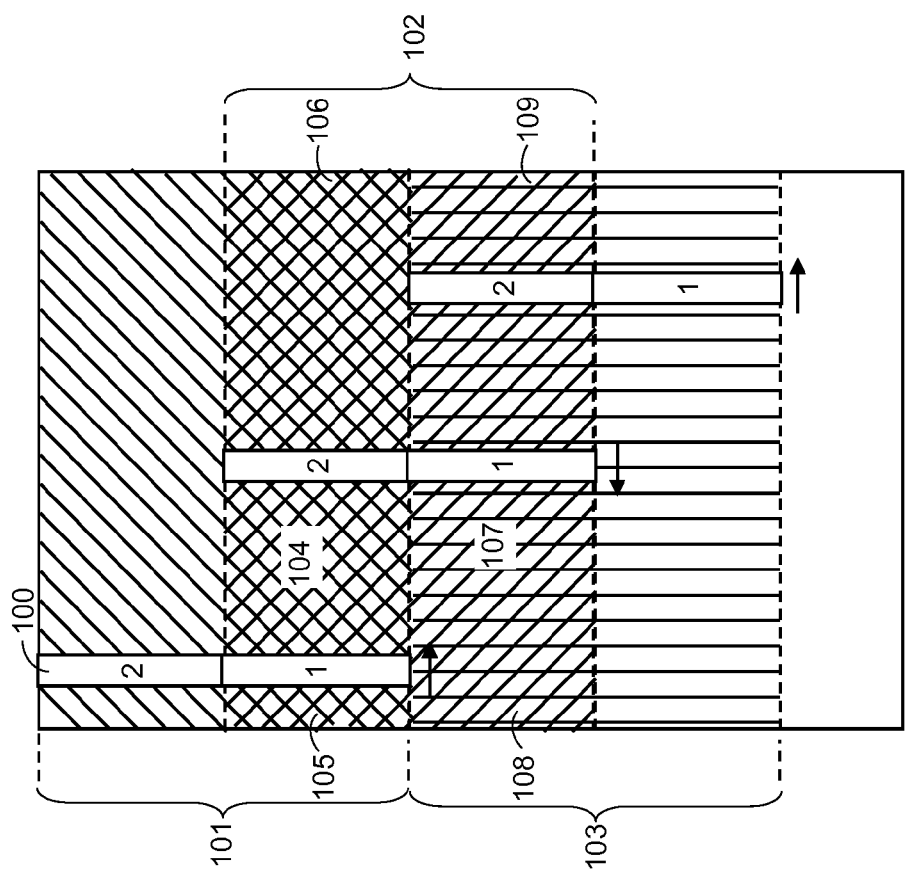
FIG. 5 is a diagram illustrating overlapping print swaths.

Consider the scenario discussed above relative to FIG. 5 where it is desired to print a blue patch using a printhead with a column of cyan nozzles that are located to the right of a column of magenta nozzles. In a left portion of the first overlap region 128 ink will be applied in the first printing pass 120 and the second printing pass 121 as cyan/magenta/long delay/magenta/cyan. In a left portion of the second overlap region 129 ink will be applied in the third printing pass 122 and the fourth printing pass 123, again as cyan/magenta/long delay/magenta/cyan. Similarly, in a right portion of the first overlap region 130 ink will be applied in the first printing pass 120 and the second printing pass 121 as cyan/magenta/short delay/magenta/cyan. And in a right portion of the second overlap region 131 ink will be applied in the third printing pass 122 and the fourth printing pass 123, again as cyan/magenta/short delay/magenta/cyan.

It can be seen that for the left portion of the first overlap region 128 and the left portion of the second overlap region 129, ink is applied such that the order of ink laydown and the timing between ink laydown on different passes is the same (cyan/magenta/long delay/magenta/cyan) for a horizontal position on the left side of the page, independent of the vertical position within the image. Likewise, it can also be seen that for the right portion of the first overlap region 130 and the right portion of the second overlap region 131, ink is applied such that the order of ink laydown and the timing between ink laydown on different passes is also the same (cyan/magenta/short delay/magenta/cyan) for a horizontal position on the right side of the page, independent of the vertical position within the image. Furthermore, it can be seen that the same would be true for all other horizontal positions across the image as well. Therefore, the abrupt changes in color and/or image structure than can occur for a conventional multi-pass print masking configuration due to the pass-to-pass differences in the order of ink laydown and the timing between ink laydown on different passes are eliminated. This drastically reduces the bi-directional banding artifacts that are often observed for bi-directional multi-pass printing.

It should be noted that the timing between ink laydown on different passes is different for the right side and the left side of the page, and therefore the color and image structure characteristics can be somewhat different from side-to-side across the image. However, any changes in the image characteristics will occur slowly across the width of the image, with no abrupt transitions. As a result, these differences will generally be much less objectionable than the bi-directional banding artifacts associated with conventional multi-pass print masking configurations, such as that illustrated in FIG. 5. As a result, the image quality is significantly improved relative to bi-directional multi-pass printing using conventional multi-pass print masks.

Figure 1:
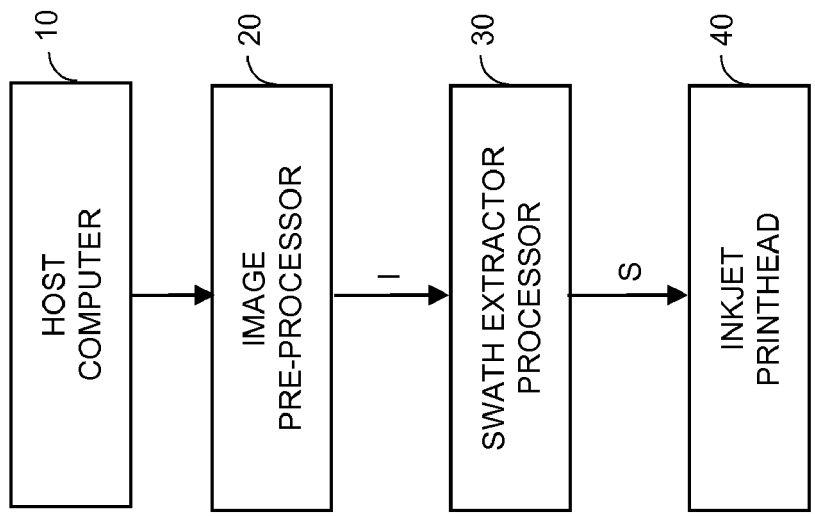
FIG. 1 is a flow diagram showing an typical inkjet printer system.
Figure 2:
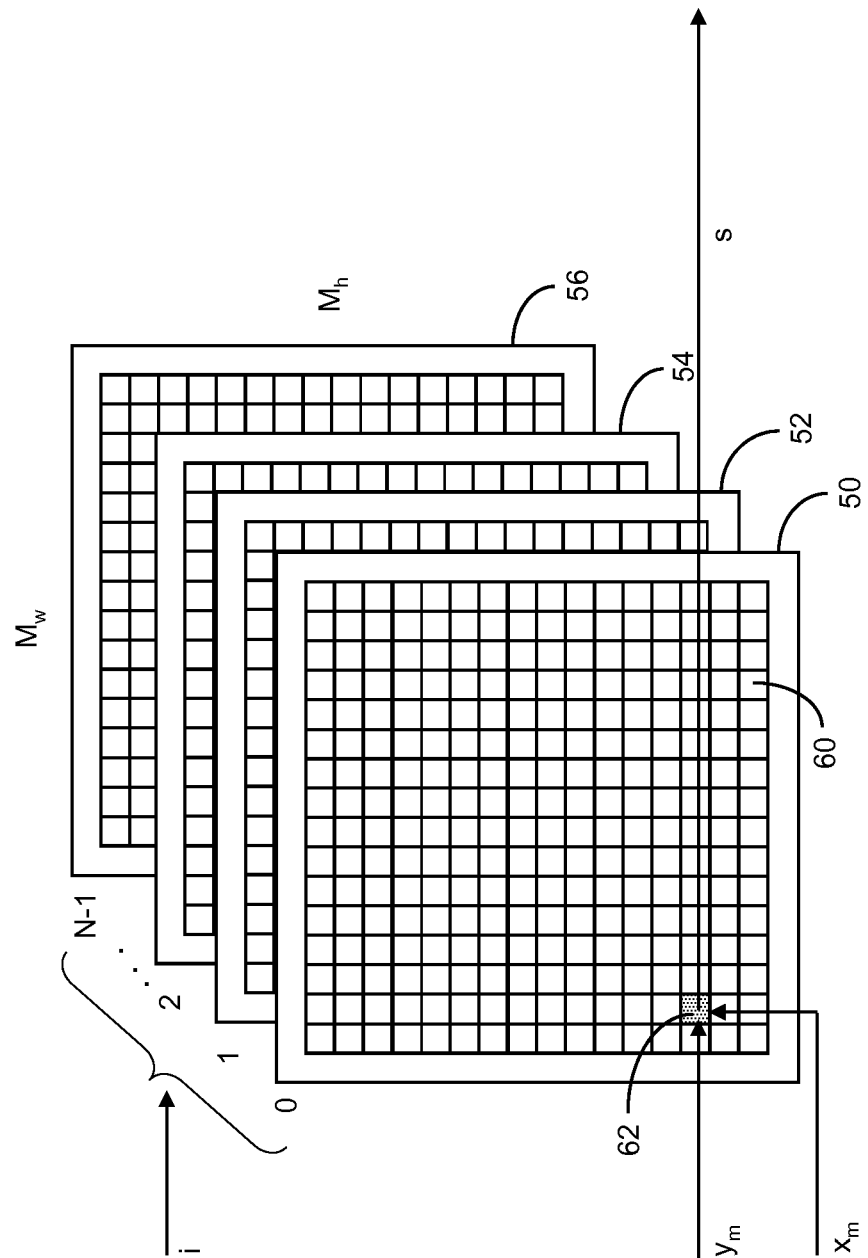
FIG. 2 is a diagram illustrating print masking according to the present invention.
Figure 3:
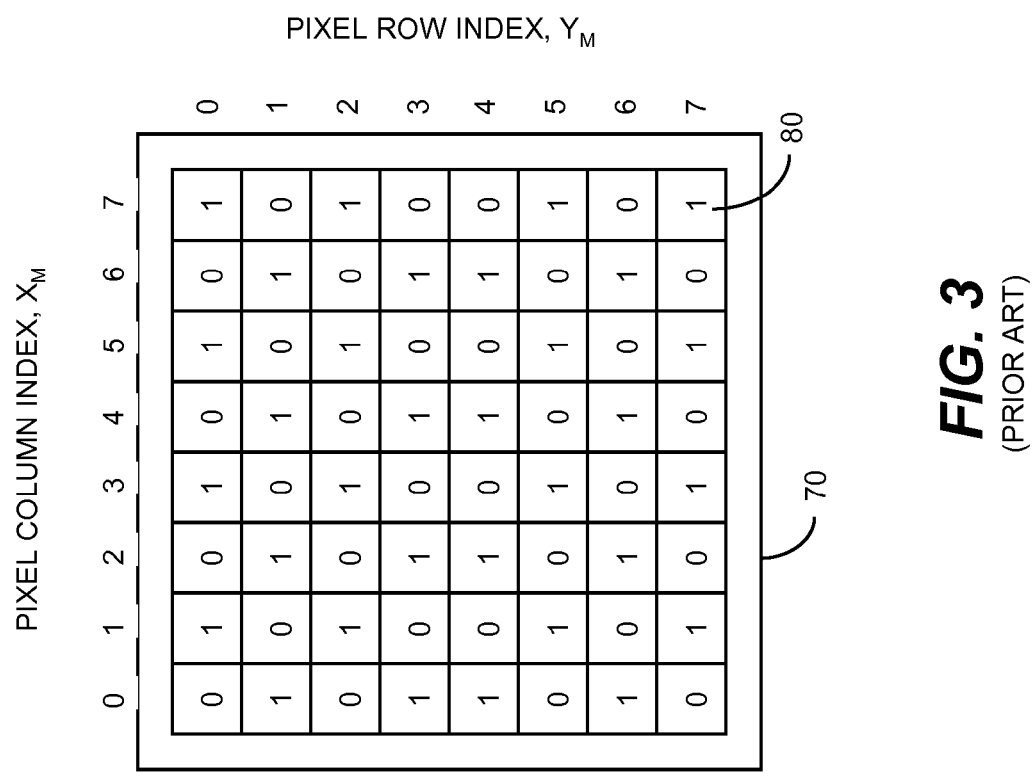
FIG. 3 is a diagram showing the details of a mask plane.
Figure 4:
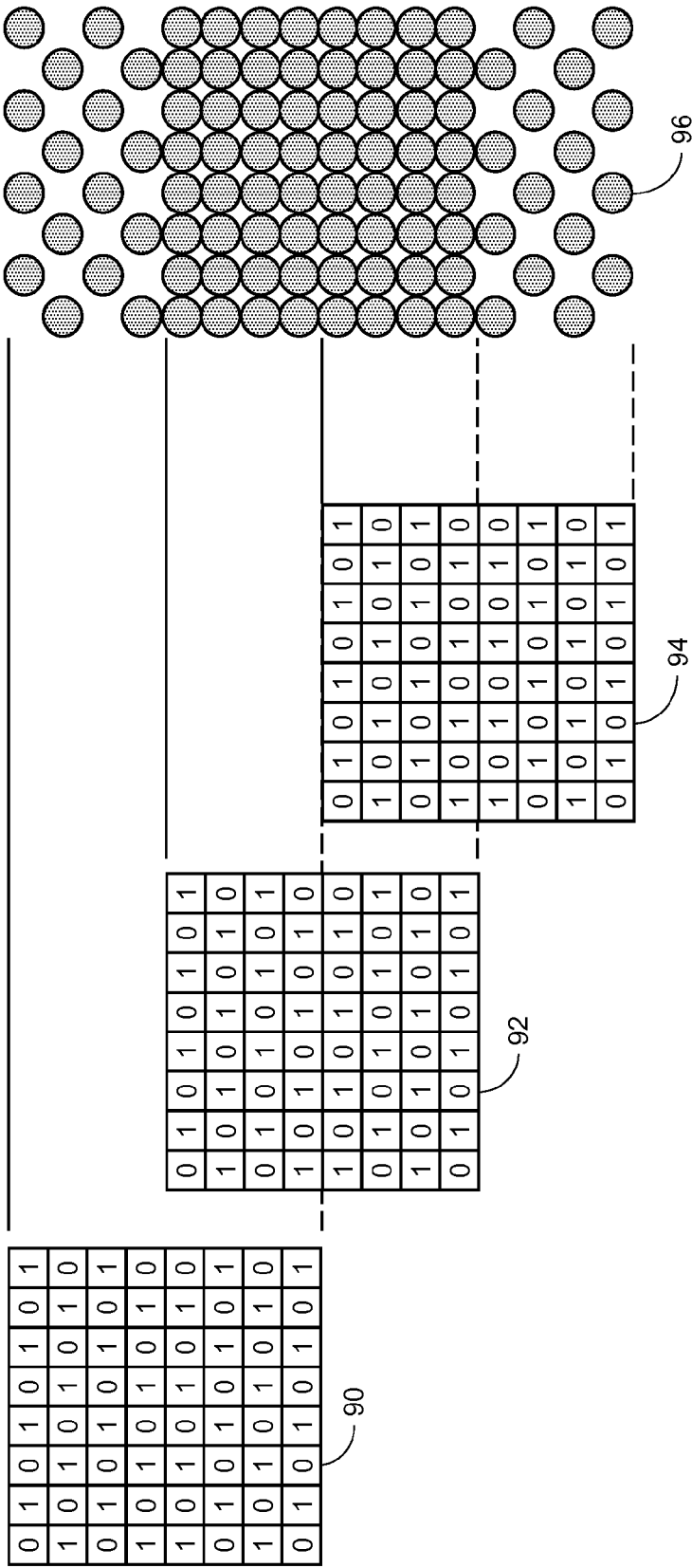
FIG. 4 is a diagram illustrating multi-pass printing.
Figure 7:
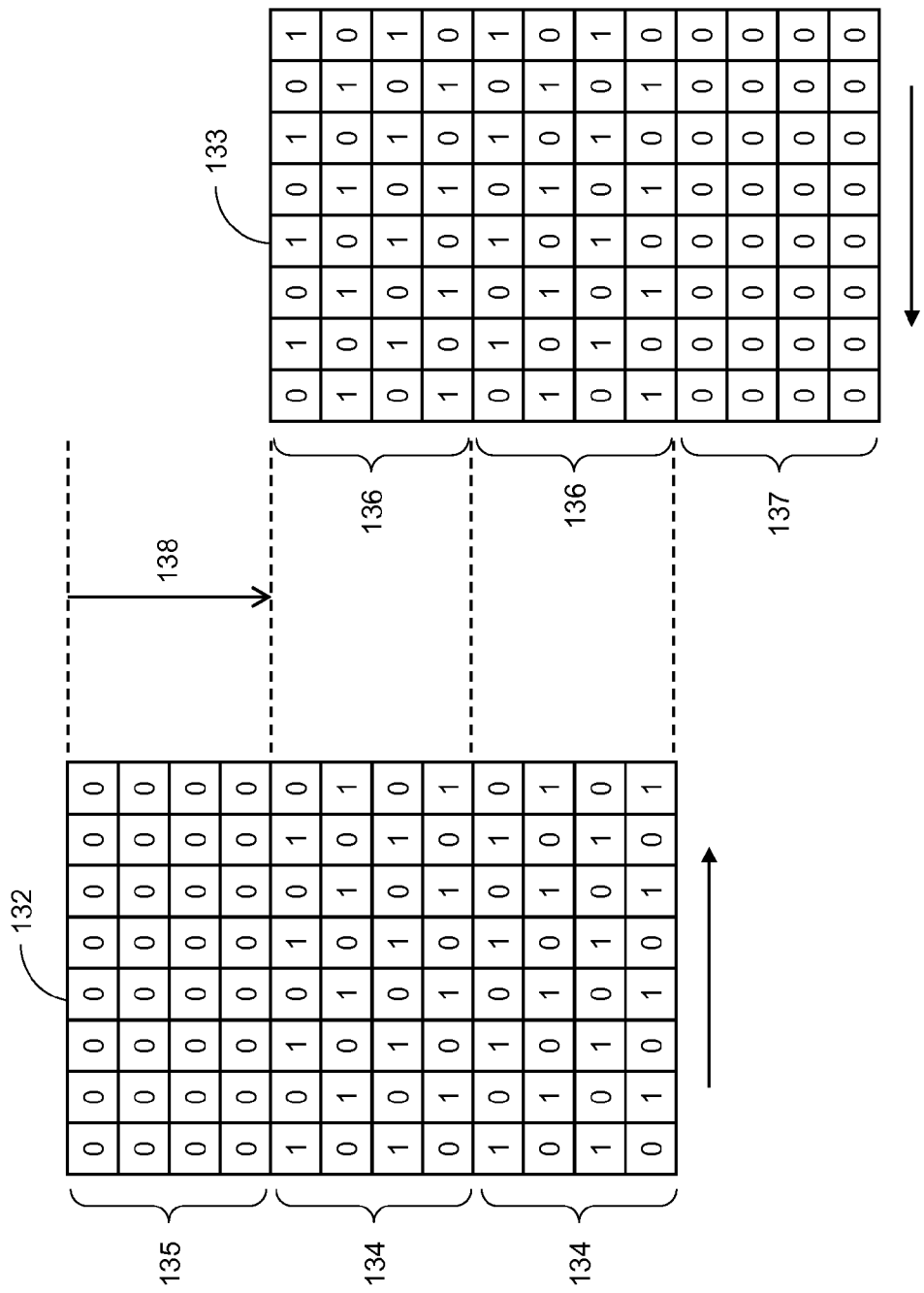
FIG. 7 is a diagram illustrating a pair of mask planes.

A more detailed illustration of how a rightward print mask 124 and a leftward print mask 125 can be defined starting from a conventional multi-pass print mask is illustrated in FIG. 7. For this example, the 2-pass mask plane shown in FIG. 3 is used as the seed pattern for forming the new print masks. A rightward mask plane 132 includes 3 segments corresponding to different subsets of the printing nozzles: two identical subsets of active nozzles 134 at the bottom and middle of the rightward mask plane 132, and a subset of unused nozzles 135 at the top of the rightward mask plane 132. The subsets of active nozzles 134 correspond to the segments of the rightward print mask 124 labeled as "1" and the subset of unused nozzles 135 corresponds to the segment of the rightward print mask 124 labeled as "X" in FIG. 6. The subsets of active nozzles 134 are formed by extracting the bottom four rows (labeled with pixel row indices $y_n$=4-7) of the conventional multi-pass mask plane 70 shown in FIG. 3. The four rows of the rightward mask plane 132 corresponding to the subset of unused nozzles 135 are filled with zeros so that no drops will be printed by these rows of nozzles.

Similarly, a leftward mask plane 133 includes 3 segments corresponding to different subsets of the printing nozzles: two identical subsets of active nozzles 136 at the top and middle of the leftward mask plane 133, and a subset of unused nozzles 137 at the bottom of the leftward mask plane 133. The subsets of active nozzles 136 correspond to the segments of the leftward print mask 125 labeled as "2" and the subset of unused nozzles 137 corresponds to the segment of the leftward print mask 125 labeled as "X" in FIG. 6. The subsets of active nozzles 136 are formed by extracting the top four rows (labeled with pixel row indices $y_n$=0-3) of the conventional multi-pass mask plane 70 shown in FIG. 3. The four rows of the leftward mask plane 133 corresponding to the subset of unused nozzles 137 are filled with zeros so that no drops will be printed by these rows of nozzles. These print masks are designed to be used with a page advance distance 138 of four pixels. It can be seen that if the rightward mask plane 132 and the leftward mask plane 133 are overlaid after applying the four pixel page advance, every pixel will have a "1" because of the fact that the top and bottom halves of the conventional multi-pass print mask plane 70 were designed to be complementary.

While the process of defining the rightward print mask 124 and the leftward print mask 125 based on a conventional multi-pass print mask represents a simple method for implementing the present invention, it will be obvious to one skilled in the art that there are many different methods that could be used to form the rightward print mask 124 and the leftward print mask 125 to achieve the desired result that the order of ink laydown and the timing between ink laydown on different passes are substantially constant for a given horizontal position.

In a preferred embodiment of the present invention, rightward print mask 124 and the leftward print mask 125 are defined by specifying a plurality of mask planes, each associated with a different printing level, as was taught in U.S. Patent Application Publication No. 2007/0201054. However, the print masks can also be defined using any of a number of other techniques for specifying where drops should be printed on each printing pass, such as by specifying threshold matrices as was taught in U.S. Pat. No. 6,238,037.

Figure 8:
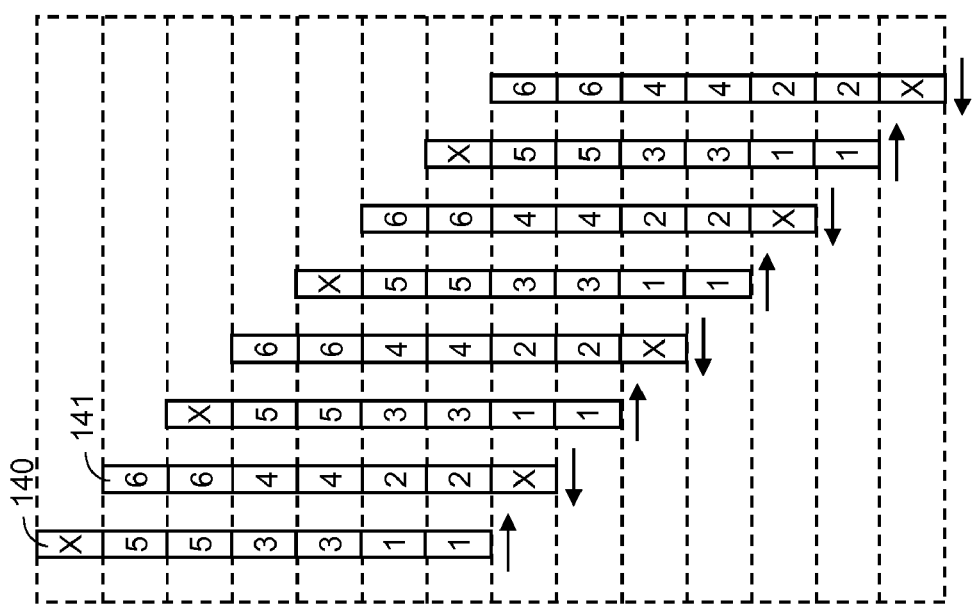
FIG. 8 is a diagram illustrating a 6-pass print masking configuration in accordance with the present invention.

The example described with reference to FIG. 6 corresponds to the case of a 2-pass print mode. The method of the present invention can easily be generalized to higher numbers of printing passes as well. For example, a 6-pass print mode configuration is illustrated in FIG. 8, which uses a rightward print mask 140, and a leftward print mask 141. In this case, the print masks are formed by breaking a conventional 6-pass print mask into six segments labeled by numbers 1 through 6. Print mask segment 1 corresponds to the portion of the print mask that controls printing the first time the printhead passes over a given region of the media (i.e., the bottom ⅙ of the print mask). Print mask segment 2 corresponds to the portion of the print mask that controls printing the second time the printhead passes over a given region of the media (i.e., the next ⅙ of the print mask up from the bottom), and so on. The rightward print mask 140 is formed, starting from the bottom, by using two of each of the odd-numbered print mask segments (1, 3 and 5) followed by a segment labeled as "X" corresponds to a set of unused ink nozzles on the top end of the printhead. Similarly, the leftward print mask 141 is formed, starting from the bottom with a segment labeled as "X" corresponds to a set of unused ink nozzles, followed by two of each of the even-numbered print mask segments (2, 4 and 6). Like the 2-pass print mode example given in FIG. 6, it can be seen that the use of the rightward print mask 140 and a leftward print mask 141 for a 6-pass bi-directional print mode ensures that the order of ink laydown and the timing between ink laydown on different passes are substantially constant for a given horizontal position within the image independent of the vertical position within the image.

Figure 9:
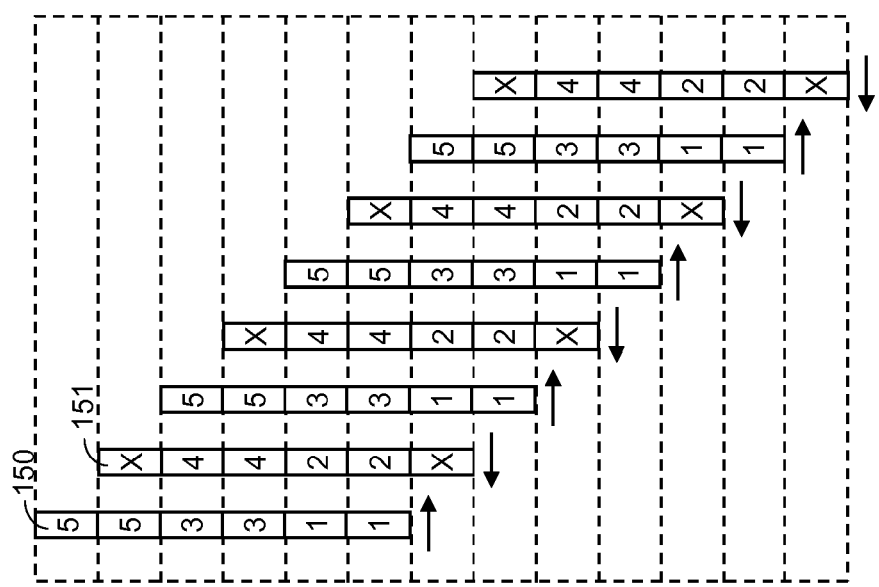
FIG. 9 is a diagram illustrating a 5-pass print masking configuration in accordance with the present invention.

FIG. 9 shows a configuration with a rightward print mask 150 and a leftward print mask 151 that can be used to implement a 5-pass print mode according to the method of the present invention. As can be seen, the formation of the print masks is somewhat different for print modes with an odd number of print passes. The print mask defined for one printing direction (rightward in this case) uses a larger set of printing nozzles than the print mask for the other printing direction. The print mask having the smaller set of printing nozzles includes two subsets of non-printing nozzles, one on either end of the printhead. In this example, the rightward print mask 150 is formed, starting from the bottom, by using two of each of the odd-numbered print mask segments (1, 3 and 5), but does not contain any segments of unused ink nozzles. The leftward print mask 151 is formed, starting from the bottom with a segment labeled as "X" corresponding to a set of unused ink nozzles, followed by two of each of the even-numbered print mask segments (2 and 4), followed by a second segment labeled as "X" corresponding to a set of unused ink nozzles on the top end of the printhead.

While the configurations described above for implementing the present invention accomplish the desired result of substantially reducing objectionable bi-directional banding artifacts, they do have an impact on the throughput of the inkjet printer. This is largely due to the fact that there are a significant number of unused ink nozzles in the leftward and rightward print masks. For the case of an even number of printing passes, it can be seen that the number of unused nozzles is substantially equal to number of active nozzles divided by the number of passes. For example, from FIG. 6 it can be seen that for a 2-pass print mode, the number of unused ink nozzles will be approximately ½ the number of active ink nozzles. Likewise, from FIG. 8 it can be seen that for a 6-pass print mode, the number of unused ink nozzles will be approximately ⅙ the number of active ink nozzles. For the case of an odd number of printing passes, the print mask for one printing direction will use all of the printing nozzles, but for the other direction there will be two subsets of unused ink nozzles. If the two printing directions are averaged, the number of unused nozzles can be seen to still be substantially equal to number of active nozzles divided by the number of passes.

The result of having these subsets of unused ink nozzles is that the page advance distance is correspondingly smaller for a given printhead length than it would be using conventional multi-pass print masks with print modes having the same number of printing passes. Essentially, the configurations that have been described are equivalent to adding an extra printing pass. Therefore, the throughput for a 2-pass print mode of the embodiment described above would be approximately equivalent to the throughput for a conventional 3-pass print mode. This would represent a decrease in the throughput to ⅔ (67%) of what it would be for the conventional 2-pass print mode. As the number of passes increases, the throughput impact is less significant. It can be seen that the throughput reduction factor will be approximately equal to N/(N+1), where N is the number of printing passes. For example, for a 6-pass print mode using the embodiment described above, the throughput would only be 6/7 (86%) of a conventional 6-pass print mode. In many cases, the image quality advantages of the present invention will be well worth the reduction in throughput.

Figure 10:
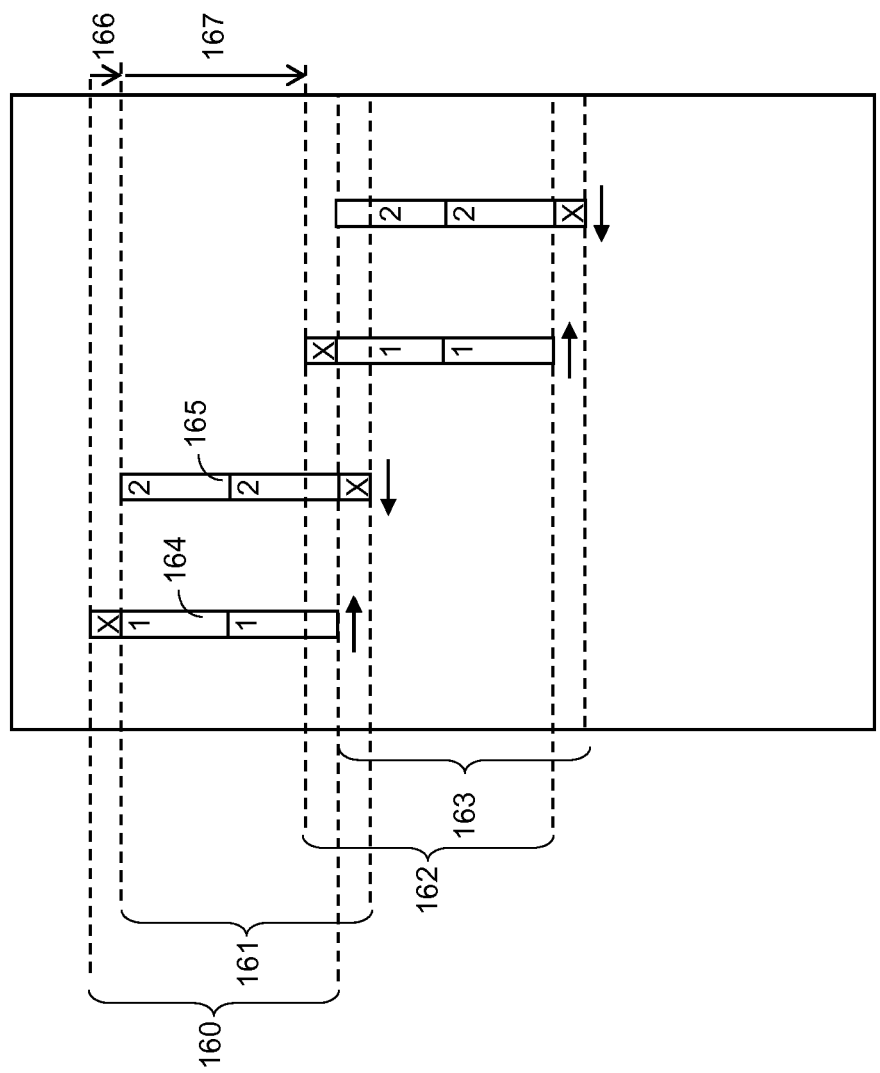
FIG. 10 is a diagram illustrating a 2-pass print masking configuration using different page advance distances in accordance with the present invention.

For print modes with an even number of printing passes, the throughput impact can be largely mitigated by using an alternate embodiment of the present invention that uses different page advance distances before the leftward and rightward printing passes. This is illustrated in FIG. 10, which represents a variation of the 2-pass print mode that was shown in FIG. 6. This approach takes advantage of the fact that the number of active ink nozzles in the rightward print mask 124 and the leftward print mask 125 are the same. Therefore, there is no reason to devote ⅓ of the printhead to unused ink nozzles. In the example shown in FIG. 10, the print masks use a substantially smaller number of unused ink nozzles. In this configuration, the printhead make a first printing pass 160 in the rightward direction. The page is then advanced a first page advance distance 166 corresponding to the number of unused ink nozzles at the top of the rightward printing mask 164 before making a second printing pass 161 in the leftward direction using a leftward print mask 165. The page is then advanced by a second page advance distance 167 corresponding to the number of active ink nozzles in the rightward printing mask 164 and the leftward printing mask 165. This process is then repeated for the third printing pass 162 and the fourth printing pass 163, and so on.

In the limit, the number of unused nozzles can be shrunk to zero. In this case, the first page advance distance 166 would be zero, and the second page advance distance 167 would be the full width of the printhead. This would produce a throughput equivalent to the conventional 2-pass print masking configuration. However, it would have the disadvantage that it eliminates any redundancy in the printing nozzles since the same nozzle would pass over a given position on the paper in both printing directions. As a result, there would be no way to compensate for artifacts associated with missing or misdirected nozzles, which would eliminate one of the advantages of multi-pass printing. Therefore, it will generally be desirable to use a first page advance distance 166 of at least a few pixels. If the number of unused nozzles is maintained at a small value, there will be a negligible impact on throughput relative to the conventional multi-pass print masking configuration, while maintaining all of the advantages of the present invention with respect to reducing the visibility of bi-directional banding artifacts. It should be noted that this approach for improving the throughput will only work for the case of an even number of printing passes, so there will be an advantage to using print modes having an even number of printing passes when implementing the present invention.

It will be obvious to one skilled in the art that the present invention can be combined with many different print masking methods. For example, in U.S. Patent Application Publication No. 2007/0201054, Billow et al. describe using print masks having a non-uniform duty cycle, meaning that not all of the nozzles in the printhead will print with the same duty (see FIG. 7 and FIG. 8 of U.S. Patent Application Publication No. 2007/0201054). Generally, the duty of the nozzles near the ends of the printhead will be lower than the duty in the center of the printhead, and the masks will be defined in such a way that the sum of the duties for the print masks over all passes will be a constant, independent of the row of the image. This approach can be advantageous for hiding banding artifacts that commonly occur near the swath boundaries. Such masks can easily be rearranged and used to form leftward and rightward print masks according to the methods described earlier. However, this can cause abrupt changes in the duty cycle across the height of the print mask, which cannot always be desirable. Alternately, it is possible to generate leftward and rightward print masks having a non-uniform duty cycle that satisfy the requirement of the present of invention that the order of ink laydown and the timing between ink laydown on different passes are substantially constant for a given horizontal position within the image. However, this requires that the leftward and rightward print masks be defined directly rather than simply rearranging conventional multi-pass print masks.

The method of the present invention can also be combined with fractional print masking techniques, such as that disclosed by U.S. Pat. No. 6,206,502. Consider the arrangement shown in FIG. 11, which represents a variation of the 2-pass print mode with unequal page advance distances that was shown in FIG. 10. In this configuration, the printhead makes a first printing pass 170 in the rightward direction. The page is then advanced a first page advance distance 176 corresponding to the number of unused ink nozzles at the top of the rightward printing mask 174 before making a second printing pass 171 in the leftward direction using a leftward print mask 175. The page is then advanced by a second page advance distance 177. This process is then repeated for the third printing pass 172 and the fourth printing pass 173, and so on. In this case, the second page advance distance 177 is less than the number of active ink nozzles in the rightward printing mask 174 and the leftward printing mask 175. As a result, this creates a 2-pass printing region 178 where the image is printed with the expected 2 printing passes, as well as an overlap printing region 179 where the edges of the print masks overlap to provide additional printing passes.

The rightward printing mask 174 is labeled with several different segments. A segment labeled as "X" corresponds to a set of unused ink nozzles on the top end of the printhead. A segment labeled "1" corresponds to the main printing region of the print mask which prints ink the first time the printhead passes over a given region of the paper. Fractional mask segments labeled "1F" and "3F" correspond to the overlap printing region 179 where the image is printed with more than 2 printing passes. The fractional mask segment labeled "1F" will print using a reduced duty the first time the printhead passes over a given region of the paper, and the fractional mask segment labeled "3F" will print using a reduced duty the third time the printhead passes over a given region of the paper. Likewise, the leftward printing mask 175 is also labeled with several different segments. A segment labeled as "X" corresponds to a set of unused ink nozzles on the bottom end of the printhead. A segment labeled "2" corresponds to the main printing region of the print mask which prints ink the second time the printhead passes over a given region of the paper. Fractional mask segments labeled "2F" and "4F" correspond to the overlap printing region 179 where the image is printed with more than 2 printing passes. The fractional mask segment labeled "2F" will print using a reduced duty the second time the printhead passes over a given region of the paper, and the fractional mask segment labeled "3F" will print using a reduced duty the fourth time the printhead passes over a given region of the paper. Generally, the duty of the fractional mask segments will be defined in such a way that the sum of the duties over all the printing passes will be a constant, independent of the row of the image.

Figure 11:
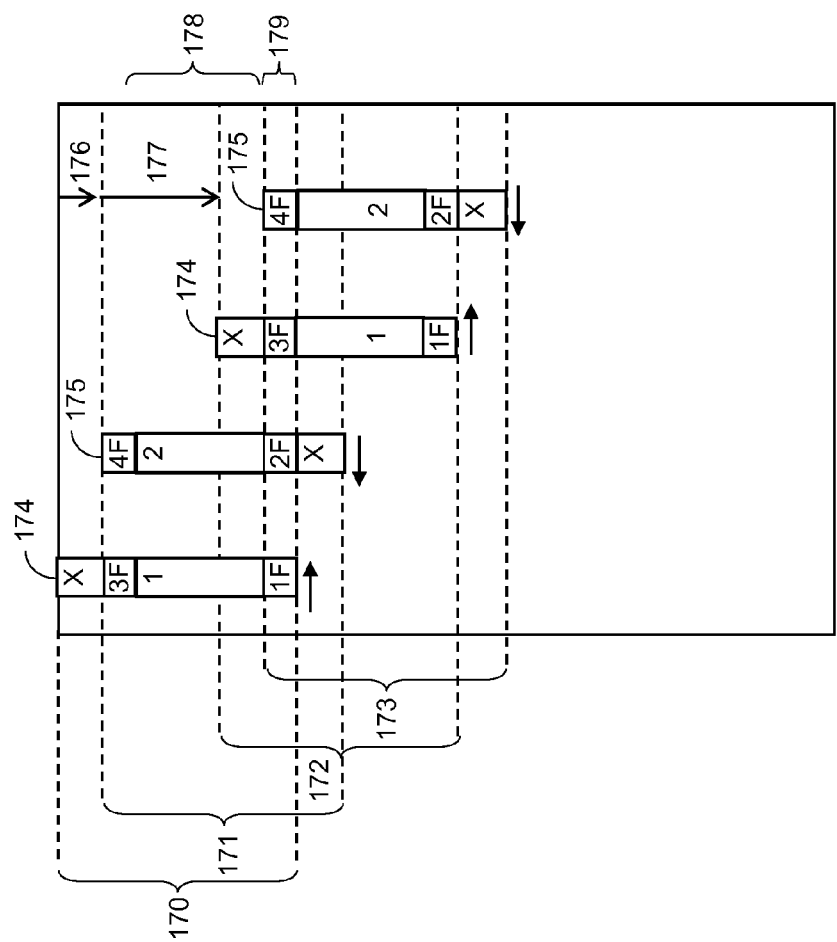
FIG. 11 is a diagram illustrating a 2-pass print masking configuration using fractional masking in accordance with the present invention.

The advantage that the fractional print mask configuration shown in FIG. 11 has over other configurations is that it will generally be less sensitive to boundary artifacts that are apt to occur at the edges of the printhead due to sources such as variations in the page advance distance. However, it can be seen that the order and timing of the ink laydown in the overlap printing region 179 will be different than in the 2-pass printing region 178. As a result, this can produce some variations in the color and/or image structure of the printed image, mitigating some of the improvements in the bi-directional banding artifacts. The objectionability of the boundary artifacts needs to be traded off against the objectionability of the bi-directional banding artifacts for a given printing configuration to determine the optimal tradeoff. Often the visibility of the boundary artifacts can be reduced substantially using an overlap printing region 179 that is only a few printing nozzles wide without producing objectionable bi-directional banding artifacts.

The invention has been described in detail with particular reference to certain preferred embodiments thereof, but it will be understood that variations and modifications can be effected within the spirit and scope of the invention.

Parts List 10 host computer
20 image preprocessor
30 swath data generator
40 inkjet printhead
50 mask plane
52 mask plane
54 mask plane
56 mask plane
60 mask element
62 mask element
70 mask plane
80 mask element
90 swath pattern
92 swath pattern
94 swath pattern
96 ink dots
100 print mask
101 first swath
102 second swath
103 third swath
104 first overlap region
105 left portion of the first overlap region
106 right portion of the first overlap region
107 second overlap region
108 left portion of the second overlap region
109 right portion of the second overlap region
119 page
120 first printing pass
121 second printing pass
122 third printing pass
Parts List Cont'd
123 fourth printing pass
124 rightward print mask
125 leftward print mask
126 first overlap region
127 second overlap region
128 left portion of the first overlap region
129 left portion of the second overlap region
130 right portion of the first overlap region
131 right portion of the second overlap region
132 rightward mask plane
133 leftward mask plane
134 subsets of active nozzles
135 subset of unused nozzles
136 subsets of active nozzles
137 subset of unused nozzles
138 page advance distance
140 rightward print mask
141 leftward print mask
150 rightward print mask
151 leftward print mask
160 first printing pass
161 second printing pass
162 third printing pass
163 fourth printing pass 164 rightward printing mask
165 leftward printing mask
166 first page advance distance
167 second page advance distance
Parts List Cont'd
170 first printing pass
171 second printing pass
172 third printing pass
173 fourth printing pass
174 rightward printing mask
175 leftward printing mask
176 first page advance distance
177 second page advance distance
178 2-pass printing region
179 overlap printing region

The invention claimed is:

1. A method for reducing banding artifacts for bi-directional multi-pass printing on an inkjet printer utilizing a printhead with a plurality of ink nozzles comprising:
  a) defining different print masks to be used for leftward and rightward printing passes such that the order of ink laydown is constant for all vertical and horizontal positions within the image, and wherein the timing between ink laydown on different leftward and rightward passes is constant for all vertical positions within the image at a particular horizontal position; and
  b) printing an input image on the inkjet printer with the defined print masks using a bi-directional multi-pass print mode;
  wherein if the print mode has an even number of printing passes, the print mask defined for leftward passes uses a first set of active ink nozzles that excludes a first plurality of contiguous ink nozzles on one end of the printhead, the first plurality of contiguous ink nozzles extending to and including the ink nozzle at the extreme end of the printhead, and the print mask defined for rightward passes uses a second set of active ink nozzles that excludes a second plurality of contiguous ink nozzles on the other end of the printhead, the second plurality of contiguous ink nozzles extending to and including the ink nozzle at the extreme other end of the printhead;
  and wherein if the print mode has an odd number of printing passes, the print mask defined for one printing direction uses a first larger set of printing nozzles and the print mask defined for the other printing direction uses a uses a second smaller set of printing nozzles together with two subsets of non-printing ink nozzles, one on either end of the printhead, the subsets of non-printing ink nozzles extending to and including the ink nozzles at the respective extreme ends of the printhead.

2. The method of claim 1 wherein if the print mode has an even number of printing passes, the number of unused ink nozzles in the first plurality of contiguous ink nozzles and the number of unused ink nozzles in the second plurality of contiguous ink nozzles are substantially equal to the number of active ink nozzles in the first and second sets of active ink nozzles divided by the number of printing passes.

3. The method of claim 1 wherein the inkjet printer is a color inkjet printer having at least two different ink colors.

4. The method of claim 1 further including defining a first page advance distance to be applied before leftward printing passes and a second different page advance distance to be applied before rightward printing passes.

5. The method of claim 1 wherein the inkjet printer is a multi-level inkjet printer having a plurality of printing levels, and the different print masks to be used for leftward and rightward printing passes are defined by specifying a plurality of mask planes, each of which is associated with a different printing level.

6. The method of claim 5 wherein the mask planes are selected by multitone code values from a multitoning operation.

7. The method of claim 1 wherein the different print masks to be used for the leftward and rightward printing passes are defined by rearranging segments of a conventional multi-pass print mask.

8. The method of claim 1 wherein at least one of the different print masks to be used for the leftward and rightward printing passes is defined to have a non-uniform duty cycle across the height of the print mask.

9. The method of claim 8 wherein page advance distances are defined to produce an overlap printing region where additional printing passes are used to reduce boundary artifacts.

* * * * *